United States Patent [19]
Shimada

[11] Patent Number: 6,122,621
[45] Date of Patent: Sep. 19, 2000

[54] METHOD AND SYSTEM FOR PROGRESS MANAGEMENT ASSISTANCE

[75] Inventor: Takanori Shimada, Tokyo, Japan

[73] Assignee: Matsushita Electric Industrial Co., Ltd., Osaka, Japan

[21] Appl. No.: 08/925,487

[22] Filed: Sep. 8, 1997

Related U.S. Application Data

[63] Continuation of application No. 08/330,465, Oct. 28, 1994, abandoned.

[30] Foreign Application Priority Data

Oct. 29, 1993 [JP] Japan .................................. 5-271821

[51] Int. Cl.$^7$ ...................................................... G06F 19/00
[52] U.S. Cl. ............................ 705/8; 705/9; 364/468.07; 364/468.08
[58] Field of Search .................................. 705/7, 8, 9, 1; 364/468.06, 468.07, 468.08, 468.03, 468.05, 474.11, 474.13, 474.16, 468.09; 709/102

[56] References Cited

U.S. PATENT DOCUMENTS

| | | | |
|---|---|---|---|
| 4,989,133 | 1/1991 | May et al. | 709/102 |
| 5,040,123 | 8/1991 | Barber et al. | 364/468 |
| 5,111,391 | 5/1992 | Fields et al. | 364/401 R |
| 5,237,508 | 8/1993 | Furukawa et al. | 364/468 |
| 5,260,868 | 11/1993 | Gupta et al. | 364/468.06 |
| 5,303,144 | 4/1994 | Kawashima et al. | 705/8 |
| 5,321,619 | 6/1994 | Matsuda et al. | 364/468 |
| 5,396,432 | 3/1995 | Saka et al. | 364/468 |
| 5,406,476 | 4/1995 | Deziel, Jr. et al. | 364/402 |
| 5,428,547 | 6/1995 | Ikeda | 364/474.16 |
| 5,524,077 | 6/1996 | Faaland et al. | 364/402 |
| 5,640,563 | 6/1997 | Carmon | 709/102 |

FOREIGN PATENT DOCUMENTS

| | | |
|---|---|---|
| 63-24443 | 2/1988 | Japan . |
| 5-158944 | 6/1993 | Japan . |

*Primary Examiner*—Joseph Thomas
*Attorney, Agent, or Firm*—Lowe Hauptman Gopstein Gilman & Berner

[57] ABSTRACT

A first storage in a system for progress management assistance stores production schedule data for a lot including: a production start time of the lot, described with a numerical value and/or a pointer; a production period for the lot, described with a numerical value; and a production finish time for the lot, described with a pointer and/or a numerical value that is obtained by adding the production period to the production start time. A second storage in the system stores an idle period table, in which an idle period between lots allocated to the same facility in the production schedule data is stored as a pair of a production finish time of a preceding lot and a production finish time of a following lot therein. An influence propagating device of the system reads actual result data of the production schedule data stored in the first storage, matches the actual result data with the production schedule data, propagates time data to the production schedule data and the idle period table via the pointers, and retrieves duplication of lots allocated to the same facility from the idle period table stored in the second storage. The influence propagating device propagates an alteration in time data to the production schedule data and the idle period table via the pointers by at least adding a duplicate period to a production start time of a following lot.

13 Claims, 8 Drawing Sheets

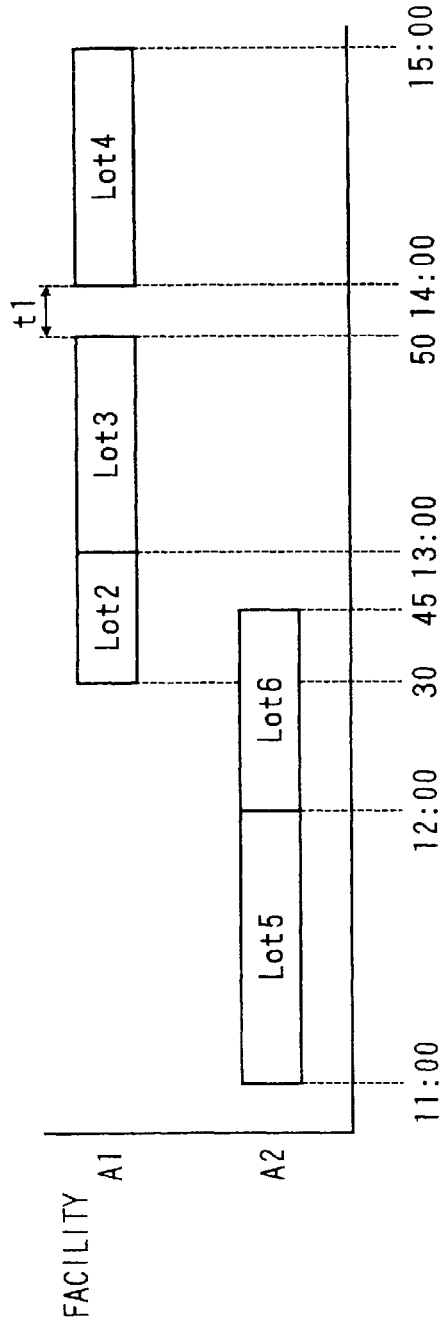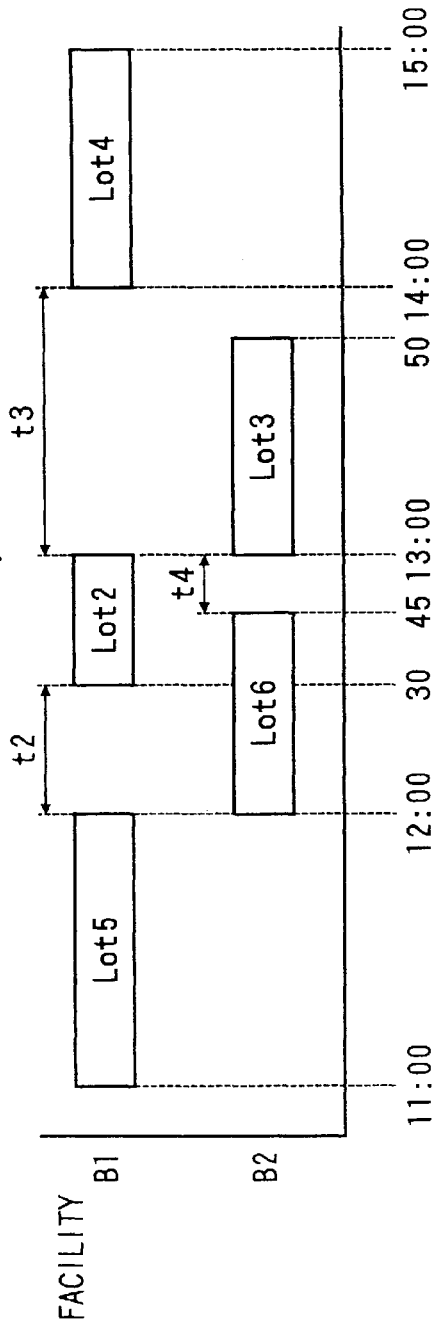

FIG. 3

```
                                                           ,301
┌──────────────────────────────────────────────────────────────┐
│ ┌──────────────────────────────────────────────────────────┐ │
│ │ Lot2-Plan: (A1,B1),                                      │ │
│ │            (Lot2-Plan-start("12:30")),                   │ │
│ │            (Lot2-Plan-end(+startseisan-jikan)),          │ │
│ │            (seisan-jikan("0:30"))).                      │ │
│ └──────────────────────────────────────────────────────────┘ │
│                                                              │
│   Lot3-Plan: (A1,B2),                                        │
│              (Lot3-Plan-start(Lot2-Plan-end)),               │
│              (Lot3-Plan-end(+startseisan-jikan)),            │
│              (seisan-jikan("0:50"))).                        │
│                                                              │
│   Lot4-Plan: (A1,B1),                                        │
│              (Lot4-Plan-start("14:00")),                     │
│              (Lot4-Plan-end(+startseisan-jikan)),            │
│              (seisan-jikan("1:00"))).                        │
│                                                              │
│   Lot5-Plan: (A2,B1),                                        │
│              (Lot5-Plan-start("11:00")),                     │
│              (Lot5-Plan-end(+startseisan-jikan)),            │
│              (seisan-jikan("1:00"))).                        │
│                                                              │
│   Lot6-Plan: (A2,B2),                                        │
│              (Lot6-Plan-start(Lot5-Plan-end)),               │
│              (Lot6-Plan-end(+startseisan-jikan)),            │
│              (seisan-jikan("0:45"))).                        │
└──────────────────────────────────────────────────────────────┘
```

| FACILITY | 1ST ITEM | 2ND ITEM | IDLE PERIOD |
|---|---|---|---|
| A1 | Lot3-Plan-end | Lot4-Plan-start | t1 |
| B1 | Lot5-Plan-end | Lot2-Plan-start | t2 |
| B1 | Lot2-Plan-end | Lot4-Plan-start | t3 |
| B2 | Lot6-Plan-end | Lot3-Plan-start | t4 |

| FACILITY | 1ST ITEM | 2ND ITEM | IDLE PERIOD |
|---|---|---|---|
| A1 | 13:50 | 14:00 | +10 |
| B1 | 12:00 | 12:30 | +30 |
| B1 | 13:00 | 14:00 | +60 |
| B2 | 12:45 | 13:00 | +15 |

FIG. 7A

| FACILITY | 1ST ITEM | 2ND ITEM | IDLE PERIOD |
|----------|----------|----------|-------------|
| A1 | 13:50 | 14:00 | +10 |
| B1 | 12:45 | 12:30 | -15 |
| B1 | 13:00 | 14:00 | +60 |
| B2 | 13:30 | 13:00 | -30 |

FIG. 7B

| FACILITY | 1ST ITEM | 2ND ITEM | IDLE PERIOD |
|----------|----------|----------|-------------|
| A1 | 14:05 | 14:00 | -5 |
| B1 | 12:45 | 12:45 | 0 |
| B1 | 13:15 | 14:00 | +45 |
| B2 | 13:30 | 13:15 | -15 |

FIG. 7C

| FACILITY | 1ST ITEM | 2ND ITEM | IDLE PERIOD |
|----------|----------|----------|-------------|
| A1 | 14:20 | 14:00 | -20 |
| B1 | 12:45 | 12:45 | 0 |
| B1 | 13:15 | 14:00 | +45 |
| B2 | 13:30 | 13:30 | 0 |

FIG. 7D

| FACILITY | 1ST ITEM | 2ND ITEM | IDLE PERIOD |
|----------|----------|----------|-------------|
| A1 | 14:20 | 14:20 | 0 |
| B1 | 12:45 | 12:45 | 0 |
| B1 | 13:15 | 14:20 | +65 |
| B2 | 13:30 | 13:30 | 0 |

FIG. 8

```
                                                   ~301
   ┌─────────────────────────────────────────────────┐
   │ Lot2-Plan: (A1, B1),                            │
   │            (Lot2-Plan-start("12:45")),          │
   │            (Lot2-Plan-end(+startseisan-jikan)), │
   │            (seisan-jikan("0:30"))).             │
   └─────────────────────────────────────────────────┘

Lot3-Plan: (A1, B2),
                (Lot3-Plan-start(+15Lot2-Plan-end)),
                (Lot3-Plan-end(+startseisan-jikan)),
                (seisan-jikan("0:50"))).

Lot4-Plan: (A1, B1),
                (Lot4-Plan-start("14:20")),
                (Lot4-Plan-end(+startseisan-jikan)),
                (seisan-jikan("1:00"))).

Lot5-Plan: (A2, B1),
                (Lot5-Plan-start("11:45")),
                (Lot5-Plan-end(+startseisan-jikan)),
                (seisan-jikan("1:00"))).

Lot6-Plan: (A2, B2),
                (Lot6-Plan-start(Lot5-Plan-end)),
                (Lot6-Plan-end(+startseisan-jikan)),
                (seisan-jikan("0:45"))).
```

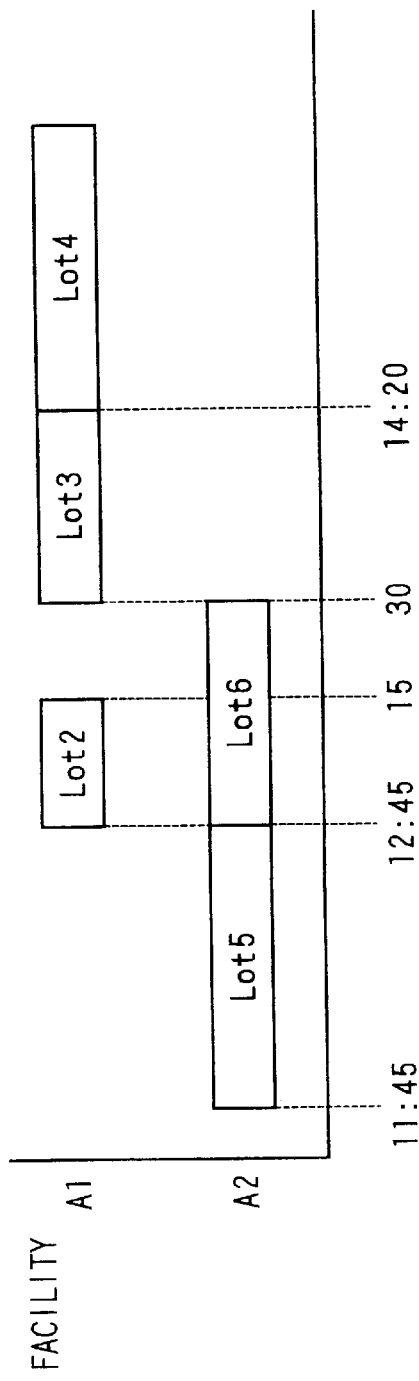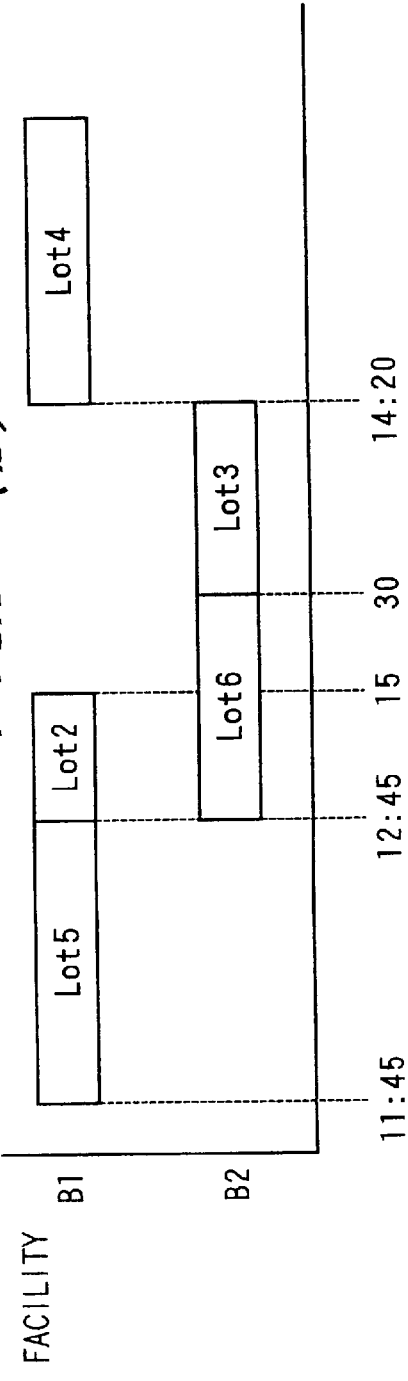

METHOD AND SYSTEM FOR PROGRESS MANAGEMENT ASSISTANCE

This application is a continuation of application Ser. No. 08/330,465 filed Oct. 28, 1994, now abandoned.

BACKGROUND OF THE INVENTION

1. Field of the Invention

The present invention relates to e production scheduling, more specifically to a method and apparatus for a progress management assistance suitable to make a production schedule according to actual results step by step.

2. Description of the Prior Art (1) As a conventional technique, a progress management assistance apparatus reads actual result data, modifies scheduled data according to the actual results, and allocates lots whose data have been modified using the same algorithm as the schedule has been formed.

(2) As another conventional technique disclosed in a specification of Japanese Patent Laid-Open Publication No. 63-24443, a start time and a finish time of an event (corresponding to a lot in this invention) are expressed by a relational expression in a network to successively determine a start time or a finish time of another event relating to each event.

The above two conventional techniques have the following disadvantages.

In the conventional technique (1), time data of each lot is expressed with numerical values but no relation between the data is explicitly described. Thus, it is necessary to modify time data of many of lots in order to keep an order of lots and production facilities used for each lot unchanged before and after an addition of the actual results. Therefore, this technique has poor efficiency.

In the conventional technique (2) disclosed in the specification of Japanese Patent Laid-Open Publication No. 63-24443, a start time and a finish time are expressed by a relational expression in a network, as well. However, if this technique is applied to a production scheduling, it is impossible to comply with a case where an idle period exists between lots.

An object of this invention is to solve the above problems retained in the conventional techniques, and to determine efficiently a new schedule with no change in an order of the lots and used facilities before and after an addition of an actual result.

SUMMARY OF THE INVENTION

The object of the present invention is achieved by the provision of a computer implemented progress management assistance method wherein a computer is programmed to perform the steps of:

setting a first lot to be produced in a first facility;

setting a second lot to be produced in the first facility or a second facility different from the first facility just after the production of the first lot in a production schedule;

describing a first production time in the production schedule with a first numerical value as a start time for production of the first lot at the first facility by the first numerical value in the production schedule;

describing a first production period in the production schedule with a second numerical value to continue the production of the first lot during the first production period described by the second numerical value in the production schedule;

describing a second production time in the production schedule with a first pointer, which indicates a first pointer time obtained by adding the first production period to the first production time, to designate a finish time for the production of the first lot at the first facility at the second production time in the production schedule;

describing a third production time in the production schedule with a second pointer, which indicates the second production time, to designate a start time for the production of the second lot at the first facility or the second facility agreeing with the second production time in the production schedule;

describing a second production period in the production schedule with a third numerical value to continue the production of the second lot during the second production period;

describing a fourth production time in the production schedule with a third pointer, which indicates a third pointer time obtained by adding the second production period to the third production time, to designate a finish time for the production of the second lot at the first facility or the second facility at the fourth production time in the production schedule; and automatically changing the second production time described with the first pointer, the third production time described with the second pointer and the fourth production time described with the third pointer according to the first pointer, the second pointer and the third pointer in cases where any of the first production time, the first production period or the second production period is changed in the production schedule.

In the above steps, the fourth production time described by the third pointer is indicated by the first production time of the first numerical value, the first production period of the second numerical value and the second production period of the third numerical value. Therefore, if any of the first production time, the first production period or the second production period is changed because of an addition of time determined as an actual result, the fourth production time is automatically changed.

Accordingly, the production schedule can be efficiently changed to a new production schedule with no change in an order of the first and second lots and the first facility or the first and second facility.

Also, the object of the present invention is achieved by the provision of a progress management setting a first lot to be produced in a facility;

setting a second lot to be produced in the same facility after the production of the first lot;

describing a first production start time with a first numerical value to start the production of the first lot at the first production start time of the first numerical value;

describing a first production period with a second numerical value to continue the production of the first lot during the first production period of the second numerical value;

describing a first production finish time with a first pointer, which indicates a first pointer time obtained by adding the first production period to the first production start time, to finish the production of the first lot at the first pointer time agreeing with the first production finish time according to the first pointer;

describing a second production start time with a third numerical value to start the production of the second lot at the second production start time of the third numerical value, on condition that the second production start time is later than the first production finish time describing a second production period with a fourth numerical value to continue the production of the second lot during the second production period of the fourth numerical value;

describing a second production finish time with a second pointer, which indicates a second pointer time according to the second pointer;

automatically changing the first production finish time described with the first pointer or the second production finish time described with the second pointer according to the first pointer or the second pointer in cases where the first production start time, the first production period, the second production start time or the second production period is changed; and automatically delaying the second production start time of the second lot not to overlap the production of the first lot and the production of the second lot with each other in cases where the first production start time of the first lot is delayed over the idle period or the first production period of the lot is prolonged over the idle period.

Also, the object of the present invention is achieved by the provision of a progress management assistance system comprising:

first storing means for storing a production schedule in which a first production start time is described with a first schedule value to start the production of a first lot at the first production start time, a first production period is described with a second schedule value to continue the production of the first lot during the first production period, a first finish time is described with a first pointer, which indicates a first pointer time obtained by adding the first production period to the first production start time, to finish the production of the first lot at the first pointer time agreeing with the first production finish time according to the first pointer, a second production start time is described with a third schedule value to start the production period is described with a fourth schedule value to continue the production of the second lot during the second production period and a second production finish time is described with a second pointer, which indicates a second pointer time obtained by adding the second production period to the second production start time, to finish the production of the second lot at the second production finish time agreeing with the second pointer time according to the second pointer;

second storing means for storing a first actual result value indicating the first production start time or a second actual result value indicating the first production period;

third storing means for storing the idle period indicating a time interval between the first production finish time of the first lot and the second production start time of the second lot; and influence propagating means for collating the first actual result value or the second actual result value stored in the second storing means with the first schedule value or the second schedule value of the production schedule stored in the first storing means, detecting the first actual results value different from the first schedule value or the second actual result value different from the second schedule value as a detected actual result value for a corresponding schedule value, replacing the corresponding schedule value of the production schedule stored in the first storing means with the detected actual result value, propagating an influence of the replacing of the corresponding schedule value with the detected actual result value to the first pointer and the second pointer to automatically change the first production finish time described with the first pointer and the second production finish time described with the second pointer according to the first pointer and the second pointer, and automatically delaying the second production start time of the second lot not to overlap the production of the first lot and the production of the second lot with each other in cases where the first production start time described with the detected actual result value is delayed over the idle period as compared with the first production start time described with the corresponding schedule value or the first production period described with the detected actual result value is a prolonged over the idle period as compared with the first production period described with the corresponding schedule value.

In the above steps and configuration, in cases where the first production start time is delayed or the first production period is prolonged because of an addition of an actual result, the first production finish time described with the first point is automatically delayed because the first point time indicated by the first pointer is expressed by the first production start time and the first production period. Also, in cases where a delay time of the first production finish time exceeds the idle period denoting a time interval between the first production finish time of the first lot and the second production start time of the second lot, because the production of the first lot overlaps with the production of the second lot, the second production start time of the second lot is automatically delayed to prevent the overlapping.

Accordingly, the progress management assistance method and system of the present invention can propagates an alternation of time data (the first production start time or the first production period) to the second lot via the pointer, and the production schedule can be efficiently renewed to a new production schedule without a change in the facility.

BRIEF DESCRIPTION OF THE DRAWINGS

FIGS. 2(a) and 2(b) is a timechart showing an initial schedule according to the embodiment of this invention;

FIG. 3 is an illustration showing the initial schedule in FIG. 2.

FIGS. 7A, 7B, 7C and 7D are tables showing a transient state of the idle periods according to the embodiment of this invention;

FIG. 8 is an illustration showing an updated schedule according to the embodiment of this invention; and FIGS. 9(a) and 9(b) is a timechart of the updated schedule according to the embodiment of this invention.

DETAILED DESCRIPTION OF THE INVENTION

Hereinafter detailed description will be made of a preferred embodiment of this invention referring to the accompanying drawings.

Figure 1:
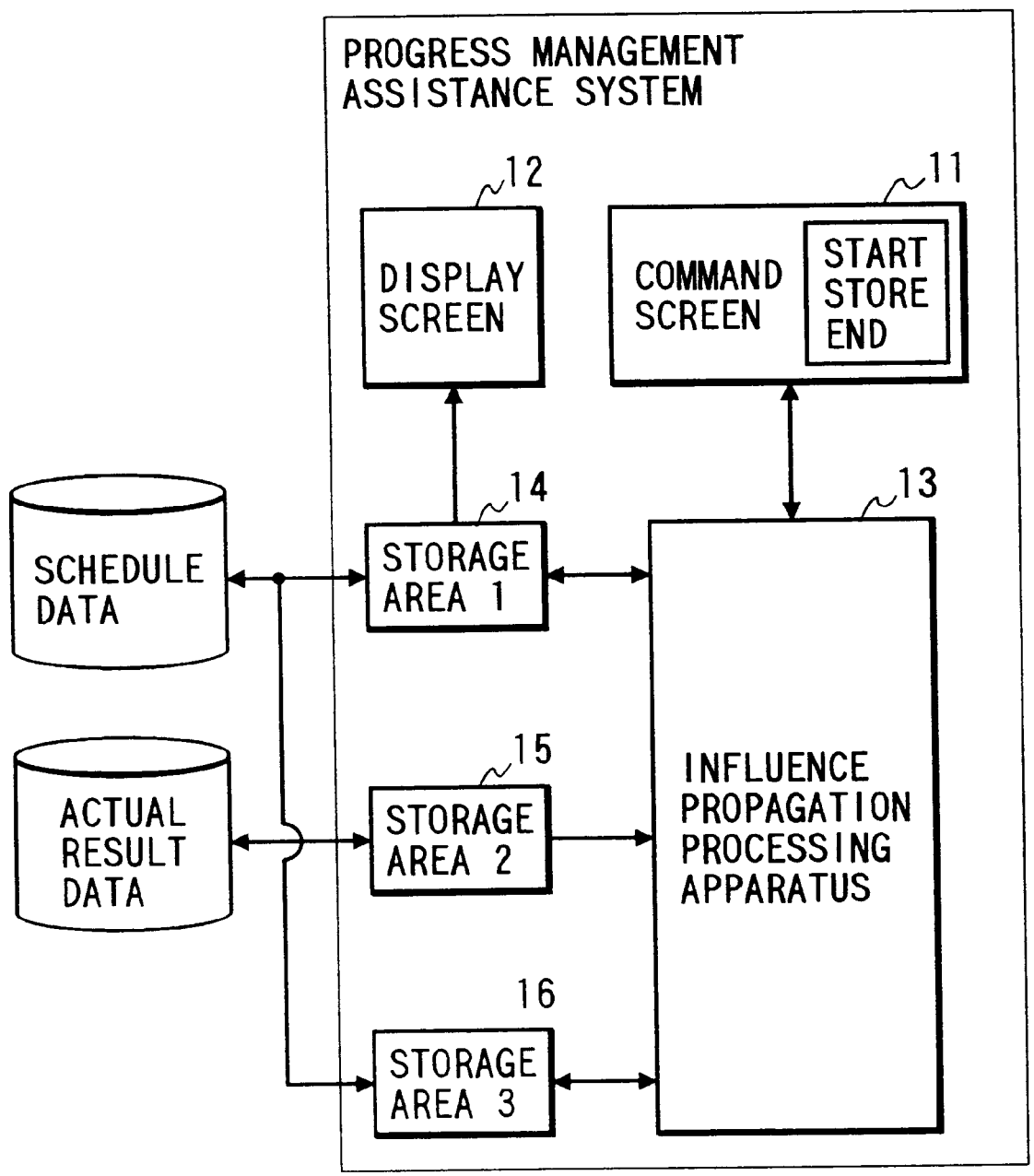
FIG. 1 is a block diagram showing a configuration of a progress management assistance system according an embodiment of this invention.

Referring now to FIG. 1, there is shown a concept of a configuration of a progress management assistance system according to an embodiment of this invention.

As shown in FIG. 1, the progress management assistance system comprises a first storage area 14 for storing a production schedule in which: one series of lots is planned to be successively produced in the same facility or in different facilities without any idle period for each series, or one pair of lots is planned to be produced in the same facility separated by a time break of an idle period in the same facility, wherein a production start time of a top lot in each series of successive lots is described by schedule data to start the production of the top lot at the production start time, a production period is described by schedule data to continue the production of each lot during the production period, a production finish time of the top lot is described by a pointer which indicates a pointer time obtained by adding the production period of the top lot to the production start time of the top lot to finish the production of the top lot at the production finish time, a production start time of a succeeding lot following each preceding lot in each series of successive lots is described by a pointer which indicates the production finish time of the preceding lot, and a production finish time of each succeeding lot is described by a pointer, which indicates a pointer time obtained by adding the production period of that succeeding lot to the production start time of that succeeding lot;

a second storage area 15 for storing pieces of actual result data respectively corresponding to one piece of schedule data stored in the first storage area 14 a third storage area 16 for storing an idle period table in which information is listed about an idle period existing between each pair of lots planned to be produced at a time break of the idle period;

influence propagation processing apparatus 13 for collating each piece of actual result data stored in the second storage area 15 with the corresponding schedule data stored in the first storage area 14, detecting one piece of actual result data different from the corresponding schedule data as a detected actual result data, replacing the corresponding schedule data of the production schedule stored in the first storage area 14 by the detected actual result data, propagating an influence of the replacement of the corresponding schedule data by the detected actual result data to the pointers of the production schedule to automatically change the production start times and the production finish times described in the schedule by the pointers, and automatically delaying the production start time of one top lot not to overlap the production of the top lot and the production of a particular lot planned to be produced before the top lot at a time break of the idle period with each other in cases where the production start time described by the detected actual result data is delayed over the idle period as compared with the production start time described by the corresponding schedule data;

a display screen 12 for displaying the production schedule stored in the first storage area 14; and a command screen 11 to which the user inputs commands.

An operation of the progress management assistance system with the above configuration will be next described by way of a schedule shown in FIG. 2. FIG. 2 illustrates a production schedule in which two sorts of facilities A and B are required at the same time to produce respective lots. This is also an example of a display displayed on the display screen 12 in FIG. 1.

It will be understood from FIG. 2 that facility A1 is assigned to produce Lot 2, Lot 3 and Lot 4 in order. Facility A2 is assigned to produce Lot 5 and Lot 6 in order. Facility B1 is assigned to produce Lot 5, Lot 2 and Lot 4 in order, and facility B2 is assigned to produce Lot 6 and Lot 3 in order.

FIG. 3 shows schedule data corresponding to the schedule shown in FIG. 2, stored in the storage area 1. In FIG. 3, reference numeral 301 designates schedule data of Lot 2. The first line shows that the facility A1 and facility B1 are simultaneoeusly used. The second line shows a scheduled production start time, which is assigned by allocating a value "12:30" to a pointer Lot2-Plan-start.

The third line shows a scheduled production finish time, where "+start seisan-jikan" is a pointer representing a value obtained by adding a production period shown in the fourth line to an actual production start time. The scheduled production finish time is assigned by allocating a pointer "+start seisan-jikan" to a value of a pointer "Lot2-Plan-end". The fourth line shows a period required for the production, where a value "0:30" is given to a pointer "seisan-jikan".

A scheduled production start time "Lot2-Plan-end" for Lot 3 is a pointer, representing that production of Lot 3 is started in simultaneous with an end of the production of Lot 2.

As above, it is possible to describe a connection relationship between the lots. An alteration in time data of two lots in the connection relationship can be propagated via the pointers to every relating lots so that modification of the schedule data is quite easy.

FIG. 4 is an idle period table corresponding to the production schedule shown in FIG. 3. The idle period table is stored in the storage area 3 in FIG. 1. Each record in the idle period table is configured with a pair of lots representing an idle period of the facility.

Figures 4A, 4B, 5:
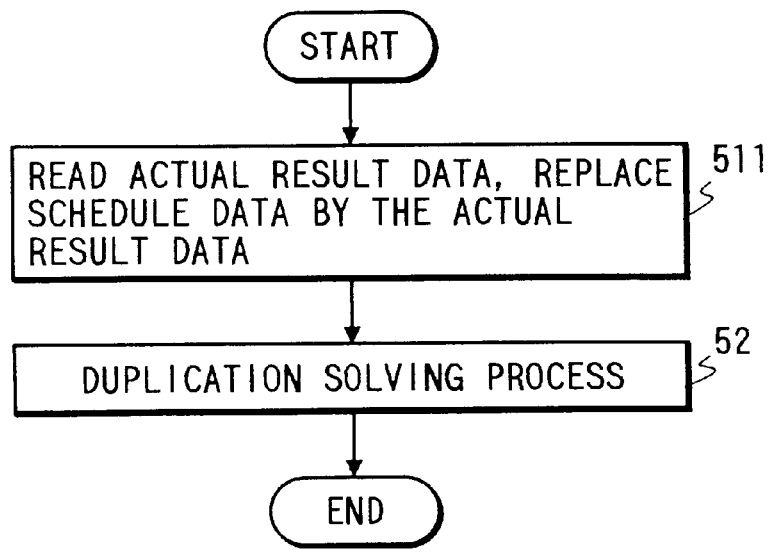
FIGS. 4A and 4B are tables showing idle periods in the initial schedule in FIG. 1.
FIG. 5 is a flowchart of a whole process conducted by the influence propagation processing system according to an embodiment of this invention.

In FIG. 4A, there are shown relationships among idle periods t1, t2, t3 and the facilities, and start and finish of each idle period. In FIG. 4B, there are shown relationships among the idle periods when a scheduled time is substituted into each pointer. It is possible to arbitrarily re-arrange an order of the records of in the idle period table.

Figure 6:
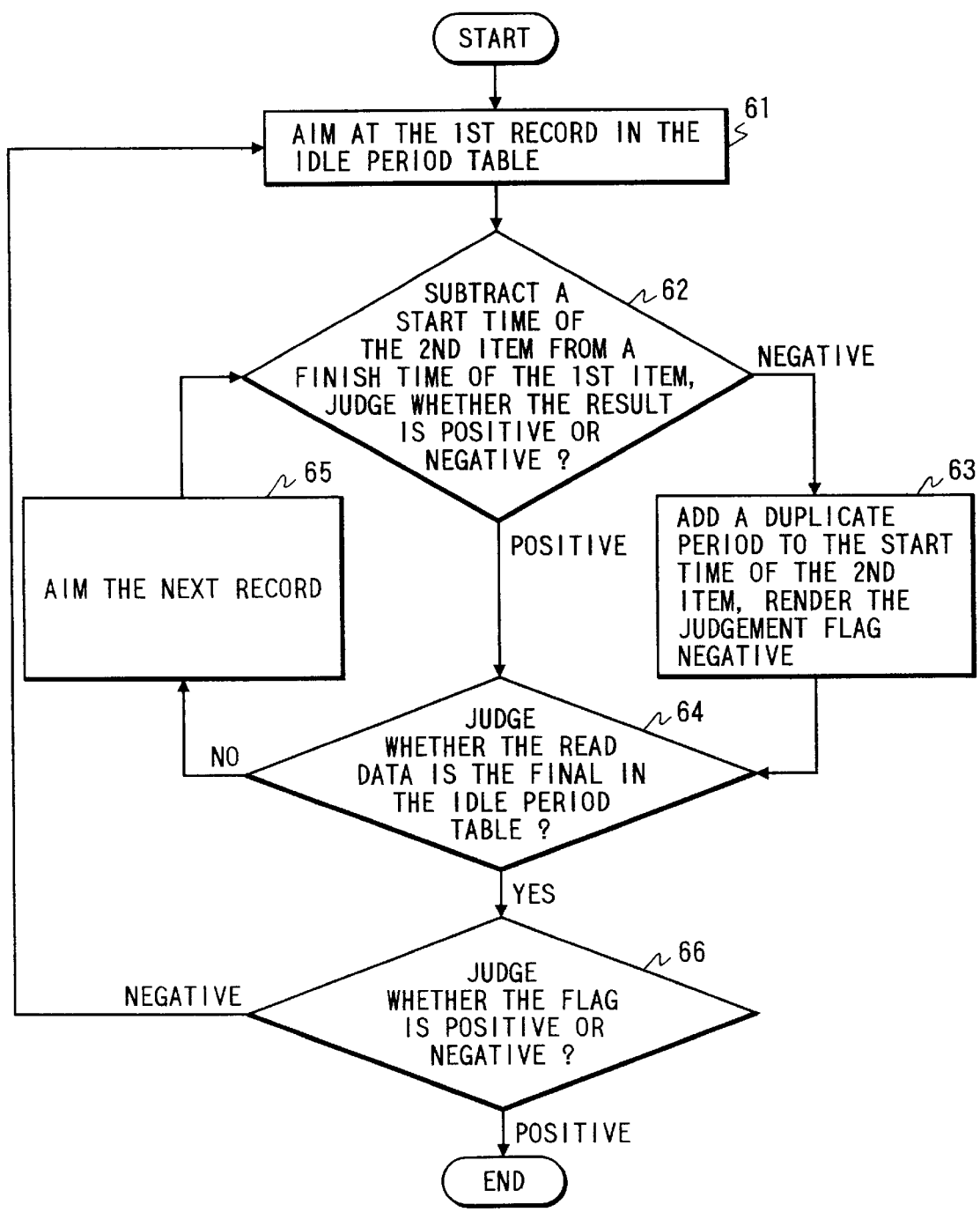
FIG. 6 is a flowchart of a process to solve duplication of lots conducted by the influence propagation processing system according to the embodiment of this invention.

In the case where a start of the production of Lot 5 delays 45 minutes, an operation of the influence propagation processing apparatus 13 shown in FIG. 1 to propagate modified data will be described next. FIGS. 5 and 6 are flowcharts showing the operation of the influence propagation processing apparatus 13.

To begin with, the influence propagation processing apparatus 13 reads the actual result data from the storage area 3, then matches the actual result data with the schedule data shown in FIG. 3 stored in the storage area 1 to replace schedule values of the scheduled data with actual result values. In other words, if the schedule value is a numerical value, the numerical value is changed into an actual result value. If the schedule value is a pointer, a value of the pointer is changed into an actual result value (Step 51).

The changed data can be propagated to the idle period table stored in the storage area 2 by virtue of the above process. That is, the scheduled start time of Lot 5 "Lot5-

Plan-start" ("11:00") shown in FIG. 3 is changed to "Lot5-Plan-start" ("11:45"). Following that, the schedule of Lot 6 of which scheduled start time is set to the finish time of the Lot 5 is changed. As a result, the idle period table shown in FIG. 4B is altered as shown in FIG. 7A. FIG. 7A shows that duplication occurs in the lots allocated to the facility B1 and the facility B2.

Next the influence propagation processing apparatus 13 solves the duplication in the lots allocated to the same facility by altering the data in the idle period table shown in FIG. 7A stored in the storage area 2 (Step 52). FIG. 6 is a flowchart of a duplication solving process.

First, a judgement flag representing a presence of corrected data about the first record in the idle period table is made positive (Step 61). Next, the finish time of the first item shown in FIG. 7A is subtracted from the start time of the second item also shown in FIG. 7a, then a judgement is made as to whether the result of the subtraction is positive or negative (Step 62). If the result is positive, the process proceeds to Step 64. If the result is negative, that is, the lots are duplicated, a duplicate period is added to the start time of the second item as shown in FIG. 7B, and the judgement flag representing the presence of the corrected data is made negative. This addition of the duplicate period is propagated to related lots according to the principle described at Step 51 in FIG. 5. This judgement flag represents that records excepting the modified record due to this propagation might be altered.

The above process is executed on each of the records (Steps 64,65). After completion of the above process on each of the records, a judgement by the judgement flag is made as to whether there is any correction of the data (Step 66). If there is correction of the data, the process from Step 61 is repeated since there is a possibility that another record has been rewritten.

FIGS. 7A, 7B and 7C show a transitions of the state of the idle period table during the above process.

The schedule data as finally reviewed, is shown in FIG. 8. On the display screen 12 there is displayed FIG. 9, which corresponds to FIG. 8. As a result of the invention, schedule alteration has been done with the same facilities, the same order and a twenty minute delay.

As above described, correction of data is propagated via the 40 pointers according to this embodiment so that effective alteration of the production schedule is feasible.

According to this invention, it is possible to determine an altered schedule with the same lot order, the same facility used for the lots before and after the addition of the actual results.

What is claimed is:

1. A computer implemented progress management assistance method wherein a computer is programmed to perform the steps of:

setting a first lot to be produced in a first facility;

setting a second lot to be produced in the first facility or a second facility different from the first facility just after the production of the first lot in a first production schedule or just before the production of the first lot in a second production schedule;

describing a first production time by a first numerical value as a start time for production of the first lot in the first production schedule or as a finish time for production of the first lot in the second production schedule;

describing a first production period by a second numerical value to continue the production of the first lot during the first production period described by the second numerical value in the first or second production schedule;

describing a second production time with a first pointer, which indicates a first pointer time obtained by adding the first production period to the first production time to designate a finish time for the production of the first lot at the second production time in the first production schedule, or which indicates a first pointer time obtained by subtracting the first production period from the first production time to designate a start time for the production of the first lot at the second production time in the second production schedule;

describing a third production time with a second pointer, which indicates the second production time, to designate in the first production schedule a start time for the production of the second lot at the third production time agreeing with the second production time, or to designate in the second production schedule a finish time for the production of the second lot at the third production time agreeing with the second production time;

describing a second production period by a third numerical value to continue the production of the second lot during the second production period described by the third numerical value in the first or second production schedule;

describing a fourth production time with a third pointer, which indicates a third pointer time obtained by adding the second production period to the third production time to designate a finish time for the production of the second lot at the fourth production time in the first production schedule, or which indicates a third pointer time obtained by subtracting the second production period from the third production time to designate a start time for the production of the second lot at the fourth production time in the second production schedule; and automatically changing the second production time described with the first pointer, the third production time described with the second pointer and the fourth production time described with the third pointer according to the first pointer, the second pointer and the third pointer in cases where any of the first production time, the first production period or the second production period is changed in the first or second production schedule.

2. A computer implemented progress management assistance method according to claim 1, wherein the step of automatically changing the second production time comprises the steps of:

preparing a first actual result value indicating the first production time, a second actual result value indicating the first production period or a third actual result value indicating the second production period;

detecting the first actual result value different from the first numerical value of the first production time, the second actual result value different from the second numerical value of the first production period or the third actual result value different from the third numerical value of the second production period as a detected actual result value for a corresponding numerical value; and replacing the corresponding numerical value with the detected actual result value.

3. A computer implemented progress management assistance method according to claim 1, further comprising the steps of:

setting a third lot to be produced in the first facility, the second facility or a third facility different from the first facility and the second facility just after the production of the second lot in the first production schedule;

describing a fifth production time with a fourth pointer, which indicates the fourth production time, to designate a start time for the production of the third lot at the fifth production time agreeing with the fourth production time according to the fourth pointer in the first production schedule;

describing a third production period by a fourth numerical value to continue the production of the third lot during the third production period;

describing a sixth production time with a fifth pointer, which indicates a fifth pointer time obtained by adding the third production period to the fifth production time, to designate a finish time for the production of the third lot at the sixth production time according to the fifth pointer in the first production schedule; and automatically changing the fifth production time described with the fourth pointer and the sixth production time described with the fifth pointer according to the fourth pointer and the fifth pointer in cases where the first production time, the first production period, the second production period or the third production period is changed in the first production schedule.

4. A computer implemented progress management assistance method wherein a computer is programmed to perform the steps of:

setting a first lot to be produced in a facility;

setting a second lot to be produced in the same facility after the production of the first lot;

describing a first production start time in the production schedule by a first numerical value as a start time for production of the first lot;

describing a first production period in the production schedule by a second numerical value to continue the production of the first lot during the first production period described by the second numerical value;

describing a first production finish time in the production schedule with a first pointer, which indicates a first pointer time obtained by adding the first production period to the first production start time, to designate a finish time for the production of the first lot;

describing a second production start time in the production schedule by a third numerical value designating a start time for the production of the second lot on condition that the second production start time is later than the first production finish time of the first lot by an idle period;

describing a second production period in the production schedule by a fourth numerical value to continue the production of the second lot during the second production period described by the fourth numerical value;

describing a second production finish time with a second pointer, which indicates a second pointer time obtained by adding the second production period to the second production start time, to designate a finish time for the production of the second lot at the second production finish time;

automatically changing the first production finish time described in the production schedule with the first pointer or the second production finish time described in the production schedule with the second pointer according to the first pointer or the second pointer in cases where any of the first production start time, the first production period, the second production start time or the second production period is changed; and automatically delaying the second production start time of the second lot not to overlap the production of the first lot and the production of the second lot with each other in cases where the first production start time of the first lot is delayed over the idle period or the first production period of the first lot is prolonged over the idle period.

5. A computer implemented progress management assistance method according to claim 4, wherein the step of automatically delaying the second production start time comprises the steps of:

calculating a difference between the first production finish time later than the second production start time and the second production start time as an overlapping period between the first lot and the second lot; and delaying the second production start time of the second lot by the overlapping period.

6. A computer implemented progress management assistance method according to claim 4, further comprising the steps of:

setting a third lot to be produced in the same facility just after the production of the second lot;

describing a third production start time with a third pointer, which indicates the second production finish time, to start the production of the third lot at the third production start time agreeing with the second production finish time according to the third pointer;

describing a third production period by a fifth numerical value to continue the production of the third lot during the third production period of the fifth numerical value; and describing a third production finish time with a fourth pointer, which indicates a fourth pointer time obtained by adding the third production period to the third production start time, to designate a finish time for the production of the third lot at the third production finish time according to the fourth pointer, wherein the step of automatically changing the first production finish time includes the step of:

automatically changing the first production finish time described with the first pointer, the second production finish time described with the second pointer, the third production start time described with the third pointer or the third production finish time described with the fourth pointer according to the first pointer, the second pointer, the third pointer or the fourth pointer in cases where any of the first production start time, the first production period, the second production start time, the second production period or the third production period is changed, and the step of automatically delaying the second production start time includes the step of:

automatically delaying the second production start time of the second lot not to overlap the production of the first lot and the production of the second lot with each other in cases where the first production start time of the first lot is delayed over the idle period or the first production period of the first lot is prolonged over the idle period.

7. A computer implemented progress management assistance method according to claim 4, further comprising the steps of:

setting a third lot to be produced in the same facility just after the production of the first lot;

describing a third production start time with a third pointer, which indicates the first production finish time, to start the production of the third lot at the third production start time agreeing with the first production finish time according to the third pointer;

describing a third production period by a fifth numerical value, on condition that the second production start time of the second lot is later than a production finish time obtained by adding the third production period to the third production start time by a second idle period, to continue the production of the third lot during the third production period of the fifth numerical value; and describing a third production finish time with a fourth pointer, which indicates a fourth pointer time obtained by adding the third production period to the third production start time, to designate a finish time for the production of the third lot at the third production finish time agreeing with the fourth pointer time according to the fourth pointer, wherein the step of automatically changing the first production finish time includes the step of:

automatically changing the first production finish time described with the first pointer, the second production finish time described with the second pointer, the third production start time described with the third pointer or the third production finish time described with the fourth pointer according to the first pointer, the second pointer, the third pointer or the fourth pointer in cases where the first production start time, the first production period, the third production period, the second production start time or the second production period is changed, and the step of automatically delaying the second production start time includes the step of:

automatically delaying the second production start time of the second lot not to overlap the production of the third lot and the production of the second lot with each other in cases where the first production start time of the first lot is delayed over the second idle period or the first production period of the first lot or the third production period of the third lot is prolonged over the second idle period.

8. A computer implemented progress management assistance method according to claim 4, further comprising the steps of:

setting a third lot to be produced in the same facility after the production of the second lot;

describing a third production start time by a fifth numerical value to start the production of the third lot at the third production start time of the fifth numerical value, on condition that the third production start time is later than the second production finish time of the second lot by a second idle period;

describing a third production period by a sixth numerical value to continue the production of the second lot during the second production period of the sixth numerical value;

describing a third production finish time with a third pointer, which indicates a third pointer time obtained by adding the third production period to the third production start time, to designate a finish time for the production of the second lot at the second production finish time agreeing with the third pointer time according to the third pointer;

automatically changing the third production finish time described with the third pointer according to the third pointer in cases where the third production start time or the third production period is changed; and automatically delaying the third production start time of the third lot not to overlap the production of the second lot and the production of the third lot with each other in cases where the second production start time of the second lot is delayed over the second idle period or the second production period of the second lot is prolonged over the second idle period.

9. A computer implemented progress management assistance method according claim 4, wherein the step of automatically changing the first production finish time comprises the steps of:

preparing a first actual result value indicating the first production start time, a second actual result value indicating the first production period, a third actual result value indicating the second production start time or a fourth actual result value indicating the second production period;

detecting the first actual result value being different from the first numerical value of the first production start time, the second actual result value being different from the second numerical value of the first production period, the third actual result value being different from the third numerical value of the second production start time or the fourth actual result value being different from the fourth numerical value of the second production period as a detected actual result value for a corresponding numerical value; and replacing the corresponding numerical value by the detected actual result value.

10. A computer implemented progress management assistance system comprising:

first storing means for storing a production schedule in which:

a first production start time is described by a first schedule value to start the production of a first lot at the first production start time, a first production period is described by a second schedule value to continue the production of the first lot during the first production period, a first production finish time is described with a first pointer, which indicates a first pointer time obtained by adding the first production period to the first production start time, to designate a finish time for the production of the first lot at the first pointer time according to the first pointer, a second production start time is described by a third schedule value to start the production of a second lot at the second production start time on condition that the second production start time is later than the first production finish time of the first lot by an idle period, a second production period is described by a fourth schedule value to continue the production of the second lot during the second production period and a second production finish time is described with a second pointer, which indicates a second pointer time obtained by adding the second production period to the second production start time, to designate a finish time for the production of the second lot at the second pointer time according to the second pointer;

second storing means for storing a first actual result value indicating an actual value of the first production start time or a second actual result value indicating an actual value of the first production period;

third storing means for storing the idle period indicating a time interval between the first production finish time of the first lot and the second production start time of the second lot; and influence propagating means for:

collating the first actual result value or the second actual result value stored in the second storing means with the first schedule value or the second schedule value of the production schedule stored in the first storing means, detecting the first actual result value different from the first schedule value or the second actual result value different from the second schedule value as a detected actual result value for a corresponding schedule value, replacing the corresponding schedule value of the production schedule stored in the first storing means with the detected actual result value, propagating an influence of the replacing of the corresponding schedule value with the detected actual result value to the first pointer and the second pointer to automatically change the first production finish time described with the first pointer and the second production finish time described with the second pointer according to the first pointer and the second pointer, and automatically delaying the second production start time of the second lot not to overlap the production of the first lot and the production of the second lot with each other in cases where:

i) the first production start time described with the detected actual result value is delayed over the idle period as compared with the first production start time described with the corresponding schedule value or ii) the first production period described with the detected actual result value is prolonged over the idle period as compared with the first production period described with the corresponding schedule value.

11. A computer implemented progress management assistance system accord to claim 10 further comprising a display screen displaying the first actual result value and the second actual result value stored in second storing means thereon.

12. A computer implemented progress management assistance system according to claim 10, wherein a third production start time is described with a third pointer indicating the second production finish time in the production schedule stored in the first storing means to start the production of a third lot at the third production start time agreeing with the second production finish time according to the third pointer, a third production period is described by a fifth schedule value in the production schedule stored in the first storing means to continue the production of the third lot during the third production period, a third production finish time is described with a fourth pointer, which indicates a fourth pointer time obtained by adding the third production period to the third production start time, in the production schedule stored in the first storing means, to designate a finish time for the production of the third lot at the third production finish time agreeing with the fourth pointer time according to the fourth pointer, and an influence of the replacing of the corresponding schedule value with the detected actual result value is propagated to the first pointer, the second pointer, the third pointer and the fourth pointer by the influence propagating means to automatically change the first production finish time described with the first pointer, the second production finish time described with the second pointer, the third production start time described with the third pointer and the third production finish time described with the fourth pointer according to the first pointer, the second pointer, the third pointer and the fourth pointer.

13. A computer implemented progress management assistance system according to claim 10, wherein a third production start time is described with a third pointer indicating the first production finish time of the first lot in the production schedule stored in the first storing means to designate a start time for the production of a third lot at the third production start time agreeing with the first production finish time according to the third pointer, a third production period is described by a fifth schedule value in the production schedule stored in the first storing means, on condition that the second production start time of the second lot is later than a production finish time obtained by adding the third production period to the third production start time by a second idle period, to continue the production of the third lot during the third production period, a third production finish time is described with a fourth pointer, which indicates a fourth pointer time obtained by adding the third production period to the third production start time, in the production schedule stored in the first storing means, to finish the production of the third lot at the third production finish time agreeing with the fourth pointer time according to the fourth pointer, a third actual result value indicating the third production period is stored in the second storing means, the third actual result value stored in the second storing means is collated with the fifth schedule value of the production schedule stored in the first storing means by influence propagating means, the first actual result value being different from the first schedule value, the second actual result value being different from the second schedule value or the third actual result value being different from the fifth schedule value is detected by the influence propagating means as the detected actual result value for the corresponding schedule value, an influence of the replacing of the corresponding schedule value with the detected actual result value is propagated to the first pointer, the second pointer, the third pointer and the fourth pointer by the influence propagating means to automatically change the first production finish time described with the first pointer, the second production finish time described with the second pointer, the third production start time described with the third pointer and the third production finish time described with the fourth pointer according to the first pointer, the second pointer, the third pointer and the fourth pointer, and the second production start time of the second lot is automatically delayed not to overlap the production of the third lot and the production of the second lot with each other in cases where the first production start time described with the detected actual result value is delayed over the second idle period as compared with the first production start time described with the corresponding schedule value or the first production period or the third production period described with the detected actual result value is prolonged over the second idle period as compared with the first production period or the third production period described with the corresponding schedule value.

* * * * *